United States Patent [19]

Schwarz

[11] E Patent Number: Re. 33,407

[45] Reissued Date of Patent: Oct. 30, 1990

[54] REVOLVING DOOR CONTROL SYSTEM

[76] Inventor: Milan Schwarz, 1770 Canyon View Dr., La Verne, Calif. 91750

[21] Appl. No.: 282,108

[22] Filed: Dec. 9, 1988

Related U.S. Patent Documents

Reissue of:

[64] Patent No.: 4,627,193
Issued: Dec. 9, 1986
Appl. No.: 712,557
Filed: Mar. 15, 1985

U.S. Applications:

[63] Continuation-in-part of Ser. No. 533,983, Sep. 20, 1983, abandoned.

[51] Int. Cl.[5] ..... E05D 15/02

[52] U.S. Cl. ..... 49/42; 49/31; 49/35; 49/44

[58] Field of Search ..... 49/30, 31, 42, 43, 44, 49/28, 264, 35; 318/603; 109/8

[56] References Cited

U.S. PATENT DOCUMENTS

| | | | |
|---|---|---|---|
| 3,466,517 | 9/1969 | Leenhouts | 318/603 |
| 4,060,039 | 11/1977 | Lagarrigne | 109/8 X |
| 4,060,935 | 12/1977 | Miller et al. | 49/42 X |
| 4,295,297 | 10/1981 | Carroll et al. | 49/42 |
| 4,341,165 | 7/1982 | Calandritti et al. | 49/42 X |
| 4,347,505 | 8/1982 | Anderson | 49/264 X |
| 4,458,446 | 7/1984 | Mochida et al. | 49/31 X |
| 4,475,308 | 10/1984 | Heise et al. | 49/42 |
| 4,530,183 | 7/1985 | Heise et al. | 49/42 |

FOREIGN PATENT DOCUMENTS

| | | |
|---|---|---|
| 2901494 | 4/1980 | Fed. Rep. of Germany . |
| 2025513 | 1/1980 | United Kingdom . |

*Primary Examiner*—Philip C. Kannan
*Attorney, Agent, or Firm*—Christie, Parker & Hale

[57] ABSTRACT

A revolving door and controls therefor are set forth to restrict access into a room to only authorized personnel. The revolving door is disposed in a housing having an entrance and an exit into the room. The revolving door includes a plurality of wings which, in cooperation with the housing, define a plurality of compartments movable in response to rotation of the door to transport a person between the entrance and exit through the housing. Included are means for identifying authorized personnel and driving the door for rotation to transport that authorized person in a selected compartment between the entrance and the exit. Means are included for sensing two or more persons in the selected compartment moving from a starting point between the entrance and the exit, the sensing means reversely rotating the door to return the selected compartment to the starting point. Also included are means to prevent a subsequent, unauthorized person, attempting to use the same card key passed back by an authorized person passing through the door.

47 Claims, 8 Drawing Sheets

20
22
24
26
28
30
32
36
38
40
42
44
56
58
60
70
72
94
110
114
122
124
2

22
24
26
28
30
34
36
38
44
46
48
50
52
54A
54B
54C
54D
72
114
122
124
146
147
110

125
128
129

80
80
82
80
80
89
90
50
52
76
78
74
76
72
70
30

147
52
30
50
146

80
85
82
87
70
83
92
72

56
112
110
48
154
START REVERSE
150
START FORWARD
RESET
STOP
107
106
107
108
102
118
98
STOP
STALL
TIMER
96
156
140
TIMER
PASSAGE THROUGH DOOR
CLOSED
152
122
132
STOP
AND
COUNTER
86°
206
188
96
98
124
136
STOP
CLOSED
161
36
147
STOP
160
TIMER
CLOSED
STOP
CLOSED
36
146
147
STOP
161
36
147
160
TIMER
CLOSED
STOP
CLOSED
36
146
147

REVOLVING DOOR CONTROL SYSTEM

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of application Ser. No. 533,983, filed Sept. 20, 1983 now abandoned.

FIELD OF THE INVENTION

The present invention relates to security doors and more particularly revolving or pivoting type security doors and controls therefor.

BACKGROUND OF THE INVENTION

Security doors and the like and in particular revolving-type security doors are designed to limit access to a certain area or room of a building or structure to only authorized personnel. For example, in the private sector, it is desirable to limit access to authorized personnel to computer rooms where confidential or vital business or personal information and data is retained in the computer memory. Unauthorized access may result in the theft or destruction of that information and data. Similarly, restricted areas such as those areas wherein research and development are being conducted, where trade secret equipment, processes or information is retained, or where valuable materials or equipment are located also requires means to limit access to only authorized personnel. Not only would unlimited access jeopardize the information and equipment as far as theft and destruction is concerned, but also may present a public crisis should terrorist gain access to those areas.

In nuclear facilities, strict security is required to protect fissionable material from theft by terrorists or the like. Security may also be required to control access to areas monitoring and operating equipment which, if damaged or destroyed, may present a danger to a large segment of the public.

In a public sector, government facilities may contain top secret information, equipment or restricted material or confidential or otherwise vital information which, if in the hands of unauthorized personnel such as terrorists, may jeopardize national security or otherwise endanger the public. As can be appreciated, tight security under these and other circumstances is of extreme importance.

Accordingly, there is a present need for a security door, and in particular, a revolving security door adapted to restrict access to the security areas or rooms to only authorized personnel. Heretofore, the only means to restrict access has been to use security guards posted at the entrances and exists of the security area. Guards present are additional expense and may not be reliable.

In an effort to dispense with the need for personnel posted at the security area, some elementary forms of security systems involving revolving doors have been developed. One type is found in U.S. Pat. No. 4,341,165, issued July 27, 1982 to Calandritti et al. However, this type of revolving door is only adapted to prevent access to those carrying weapons and the like as sensed by a metal detector, and does not attempt to completely prevent access by unauthorized personnel.

In another type of revolving door, U.S. Pat. No. 4,295,297, issued Oct. 20, 1981 to Carroll et al, the revolving door is adapted to only prevent reverse movement or travel of a person from one area to another. The revolving security door does not attempt to restrict access to, for example, a security room, but only to prevent unauthorized exit. Accordingly, this type of revolving door is only concerned with controlling the direction of movement of personnel rather than restricting access.

As can be appreciated, none of the prior art focuses upon a revolving security door and controls therefore to limit access and exit to and from a security area to only authorized personnel. In particular, none of the revolving doors found in the prior art address the major problems faced when designing a revolving security door and controls to limit access and exit to and from a security area. One major problem, hereinafter referred to as piggy-backing, is where an unauthorized person attempts to accompany an authorized person, in the same compartment, through the revolving door. Revolving doors heretofore found in the prior art have been unable to recognize and prevent such a mode of unauthorized access. Another problem hereinafter referred to as "pass back", is that of where an authorized person, as recognized by the door control system, for example by a card key or the like, passes back the card key to an unauthorized individual who uses the same card to gain entrance. Still another problem is that of preventing simultaneous travel of an unauthorized person from, for example, the door entrance into the security area as an authorized person moves with the door from the security area to return to the door entrance. Yet another problem not addressed in the prior art, over and above the recognition of authorized personnel and the various modes of unauthorized entry noted above, is the return of the unauthorized person to his or her point of entry into the door.

SUMMARY OF THE INVENTION

There is therefore, provided in the practice of the preferred embodiment of the present invention, a security door and controls therefor to restrict access into a room to only authorized personnel. The security door has a housing having an entrance and an exit into the room. The door includes a member rotatably disposed in the housing and having a plurality of wings which, in cooperation with the housing, define at least one compartment movable in response to rotation of the member to transport a person between the entrance and exit through the housing. The door control includes means for enabling the member for rotation to move a selected compartment between the entrance and exit in response to identification of an authorized person.

The enabling means may simply release the member for rotation or may actively drive the member. As the member is rotated, means are provided for generating pulses, each pulse representing an increment of movement for the compartment between the entrance and exit. Determining means establish, from the number of pulses from an index position, the position of the compartment. To establish the progression of the authorized person through the door, sensing means which may be foot pressure activated switches generate a signal as the authorized person traverses through a designated region of the housing. To particularly prevent piggy-backing, comparing means compare the determined position of the compartment with the signal generated by the sensing means. Should the position of the compartment and the generation of the signal determine that an unauthorized person is also within the compartment, the comparing means issues a disabling command to prevent further movement of the compartment toward the exit. The disabling command may brake and hold the member against rotation, may enable only reverse movement of the compartment to discharge the persons within the compartment or, if the member is driven, may reverse the rotation of the member to forcibly discharge the individuals from the door.

By providing the determining means the operation of the door can be easily varied to sense or perform certain functions at desired compartment positions. An example would be sensing means to determine, at a designated compartment position, whether the authorized person has passed through the door, the sensing means generating an appropriate signal. Should an unauthorized individual attempt to pass in the same direction through the door after the authorized person using the same authorization indicia (e.g. card key) passed back by the authorized person, the sensing means would generate a signal resulting in disabling of the door. Further, the door may be stopped at desired compartment positions to, for example, permit the authorized person to interact with a device such as an automatic teller or to scan the individual with a metal detector or the like.

More particularly, the door according to the present invention includes a rotatable drive shaft operated by an electric motor under control of a microprocessor which receives and counts pulses from a pulse generator which issues a pulse for approximately every 3° of compartment pivot. Switches, closed by foot pressure, generate signals received by the microprocessor as a person passes through the door. Switches are arranged such that a signal is generated as the individual first begins to pass through the door. At a compartment location, as determined by the microprocessor, where closure of the switches indicates a piggy-backing situation, the microprocessor thereafter controls the motor to reversely rotate the door to return the compartment to the starting position.

For a revolving door, switch means are provided to prevent an unauthorized person from passing through the door in a reverse direction as an authorized person is passing in a forward direction.

BRIEF DESCRIPTION OF THE DRAWINGS

These and other features and advantages of the present invention will be appreciated as the same becomes better understood by reference to the following detailed description of the presently preferred embodiment when considered in connection with the accompanying drawings wherein:

FIG. 16 is a schematic, top view of another embodiment of the present invention for use with automatic tellers or the like.

DETAILED DESCRIPTION

Figure 1:
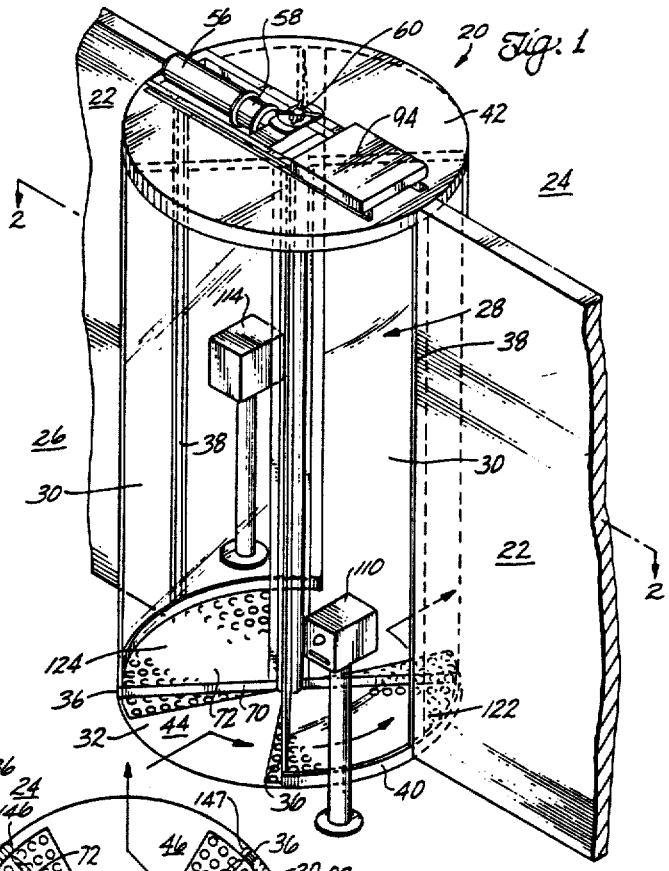
FIG. 1 is a perspective view of a revolving door incorporating the control according to the present invention.

Turning to FIG. 1, an embodiment of a security door 20 according to the present invention is shown. The security door 20 may be of a revolving type and is incorporated into a wall shown generally as 22 which separates a security area 24 from a general access area 26. The security area 24 may be a computer or a control room, laboratory, security corridor or the like to which access is to be restricted to authorized personnel. While the general access area 26 may also be a secured area accessible to authorized personnel having a lower security clearance, it is to be understood that the wall 22 with the door 20 provides a security barrier between the two aforesaid areas.

Figure 2:
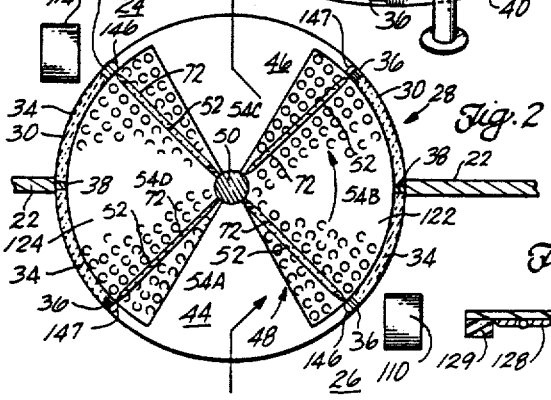
FIG. 2 is a sectional plan view of the door of taken along line 2—2 of FIG. 1.

The security door 20 has a cylindrical housing 28 which includes upstanding, semi-cylindrical panels 30. The panels 30, as shown in FIGS. 1 and 2, extend from the floor of the facility or from a provided circular bottom 32 disposed between the panels 30. The panels 30 are spaced from each other and arranged to be coaxial and of the same diameter, each spanning approximately 90° of arc. The axis defining the panels 30 will hereinafter be referred to as the door axis. Each panel 30 is fashioned from a pair of semi-cylindrical segments 34 connected between and supported by edgeposts 36, a center post 38, and a bottom skirt 40 secured to the bottom 32. The center posts 38 are connected to the wall 22 to incorporate the panels 30 into the wall structure. The segments 34 may be fashioned from glass, bullet-proof glass or acrylic as desired.

At the upper end of the housing 28, the security door 20 includes a circular top 42 coaxial with and extending between the panels 30. Typically, the top 42 will be disposed in or incorporated into the ceiling (not shown) of the facility. As can be appreciated from FIGS. 1 and 2, the panels 30, top 42, and bottom 32 cooperate to define the cylindrical housing 28 having an arcuate entrance 44 diametrically opposed to an arcuate exit 46. The entrance 44 is disposed in the general access area 26 whereas the exit 46 is located in the security area 24.

To prevent unauthorized persons from passing from the entrance 44 through the housing 28 to the exit 46 and to the security area 24, the door 20 includes a revolving member 48 disposed in the housing 28 (FIG. 2). The member 48 has a rotatable shaft 50 supported between the top 42 and bottom 32 and along the door axis. The top 42 has an axial opening (not shown) through which the shaft 50 passes for purposes which will hereinafter become evident. Four wings 52 project outwardly from the shaft 50 to, when the shaft is rotated, sweep closely from the panels 30 as best shown in FIG. 2. While the door 20 illustrated preferably has four identical panels 52 spaced 90° from one another, it is to be understood that more or less panels could be used as desired. The four spaced panels 52 define, in cooperation with the housing 28, four semi-cylindrical compartments 54a through 54d. When the shaft 50 is rotated the panels 52 revolve within the housing 28 to move the compartments 54a through 54d in a revolving fashion about the door axis between the entrance 44 and the exit 46. A person desiring to move from one of the areas to the other enters a selected compartment and travels therewith betweem the entrance 44 and the exit 46.

Figure 4:
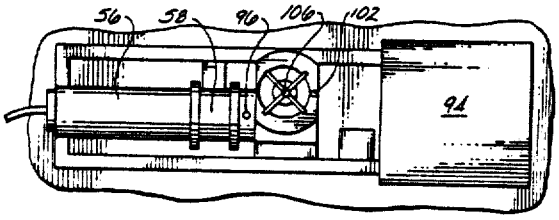
FIG. 4 is a top view of the revolving door.
Figure 5:
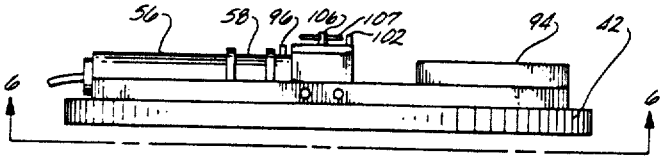
FIG. 5 is a side view of the top of the revolving door.

To provide a means to drive the shaft 50 for revolving the panels 52 and moving the compartments, the door 20 includes an electric motor 56 mounted to the top 42 as shown in FIGS. 1, 4 and 5. In the preferred embodiment, the motor is a one quarter horsepower (¼ hp) 90 volt dc, reversible, variable speed motor having a maximum output shaft speed of 1750 rpm. To step down the motor speed, the motor output shaft (not shown) is coupled to a motor multiplier 58 which, in a well-known fashion, has an output shaft speed of one-fifth (1/5) of the motor 56 output speed. To further reduce the motor output shaft speed the multiplier output shaft (not shown) is coupled to a right-angle, worm-type gear reducer 60 which steps down the speed of the multiplier output shaft 150 times. The output of the gear reducer 60 is, in turn, connected to and drives the shaft 50. Due to the variable speed of the motor 56, the shaft 50 and thereby the compartments 54a–54d can be controlled to revolve simultaneously within the housing 28 from 0 to 12 rpm.

Figure 6:
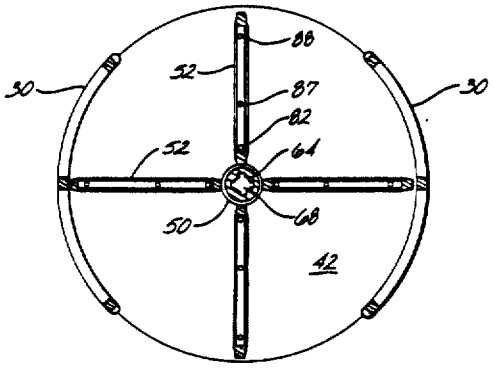
FIG. 6 is a view of the underside of the top of the revolving door taken along 6—6 of FIG. 5.

To couple the shaft 50 to the gear reducer 60, the shaft 50 has at its upper end an axial, splined opening 64 (FIG. 6). Similarly, the gear reducer 60 includes a splined receptacle (not shown). A splined stub shaft 68 is cooperatively received by the shaft opening 64 and the receptacle 66 to couple the shaft 50 to the gear reducer 60 for rotation thereof.

By virtue of the stub shaft 68, the mounting of the shaft 50 in the housing 28 is greatly simplified. Heretofore, the shaft was initially positioned in the housing with the top and drive assembly subsequently mounted and connected thereto. According to the present invention motor 56, multiplier 58, and gear reducer 60 can be mounted to the housing 28 prior to the shaft installation at, for example, the factory. To install the shaft 50, the stub shaft 68 is positioned in the shaft opening 64. The shaft 50, initially at a tilted position, is located within the housing 28 and the stub shaft 68 is inserted into the receptacle 66. The shaft 50 is thereafter secured for rotation within the housing 28.

As illustrated in the drawings, in particular FIGS. 1, 2, 7, and 8 the shaft 50 is adapted to mount the wings 52. Each wing 52 includes a rectangular frame 70 which may be fashioned from aluminum or the like to reduce the weight thereof. Disposed in the frame 70 is a pane 72 of glass, bullet-proof glass, acrylic or other suitable material as desired. The frame 70 has a length to project from the shaft to sweep closely from the panels 30 as the member 48 revolves and a height to span from a location near the bottom 32 to a position near the top 42. Accordingly, the wings 52, in cooperation with the housing 28, define the semi-cylindrical compartments 54a–54d.

Figure 7:
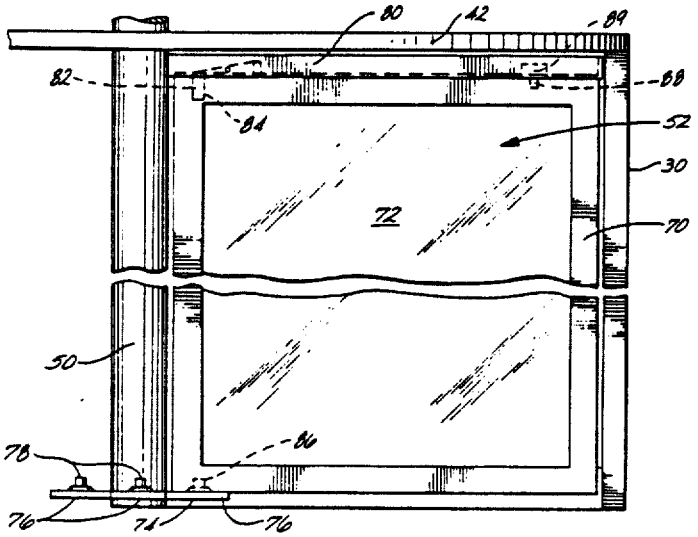
FIG. 7 is a broken front view of a wing for the revolving door.
Figure 8:
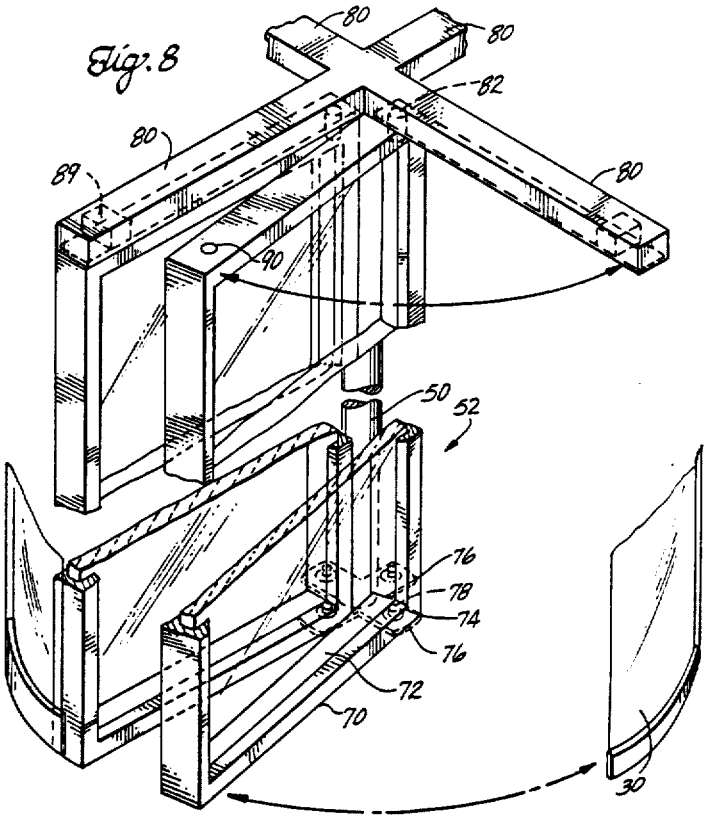
FIG. 8 is a perspective partial view of the revolving door showing the pivoting of a wing to provide access through the door in the event of an emergency.
Figure 8A:
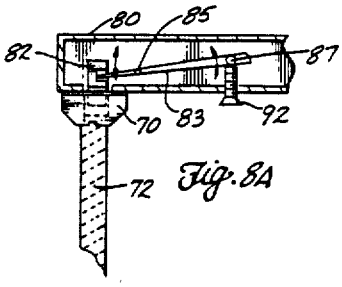
FIG. 8A is a partial section view of an arm which mounts a wing showing a retractable pivot pin to aid in the assembly of the wing to the revolving door.

During construction, or in the event of an emergency such as a fire, in the security area 24, it may be necessary to permit personnel to freely move through the door, particularly from the security area 24 to the general access area 26. To provide for such free movement, the wing frames 70 are pivotally mounted to the shaft 50 as best shown in FIGS. 7, 8 and 8A. Near the bottom of the shaft 50, there is provided a cross-shaped support 74 defined by four outwardly projecting rectangular tabs 76. The tabs 76 are spaced 90° apart in a manner identical to that of the wings 52. Upstanding from each tab 76, spaced from the shaft 50, is a cylindrical lower pivot pin 78 arranged along a vertical axis hereinafter referred to as the wing pivot axis. Near the upper end of the shaft 50 are four outwardly projecting rectangular and tubular arms 80. The arms 80 are spaced apart by 90° and are arranged to be vertically aligned over the tabs 76. The lengths of the arms 80 are such as to be coextensive with the wing frame 70. Depending downwardly from each arm spaced from shaft 50, is a retractable upper pivot pin 82 disposed to be coaxial with the wing pivot axis.

To mount each wing to the shaft 50, the wing frames 70 include bores 84 and 86 at, respectively, the upper and lower edges thereof each adapted to receive respectively the upper and lower pivot pins 78 and 82. It can be appreciated from FIGS. 7 and 8 that each wing 52 can, accordingly, pivot about the wing pivot axis toward the neighboring wings 52. As shown, during a fire or other emergency, in the security area 24, the wing 52 is preferably pivoted toward the entrance 44 so that movement from the exit 46 through the housing 28 to the entrance 44 is not impeded.

To facilitate assembly of the wings 52 onto the shaft 50 and more particularly the support 74 and arms 80, the upper pivot pin 82 is retractable into the arm 80 as shown in FIG. 8A. The upper pivot pin 82 includes a slot to receive one end of a lever 83 adapted to pivot about a fulcrum 85 within the arm 80 whereas at the other end the lever 83 is mounted to a screw 92 disposed at the underside of the arm. A rotatable ball 87 maintains the lever 83 in engagement with the screw 92.

To mount a wing 52, the upper pivot pin 82 is retracted into the arm 80 by rotation of the screw 92 which causes the lever 83 to pivot about the fulcrum 85 to the position shown in FIG. 8A. The wing 52 is mounted such that the lower pivot pin 78 is received into the bore 86. Thereafter, the wing 52 is positioned preferably at or near an orientation orthogonal to the arm, so that the bore 89 is aligned to register with the upper pivot pin 82. Rotation of the screw 92 pivots the fulcrum 83 to extend the upper pivot pin 82 from the arm 80 into the bore 84 pivotably mounting the wing 52 to the shaft 50.

In normal, non-emergency situations, it is necessary to hold and secure the wings in the proper 90° spacing relative to one another. Accordingly, each arm 80 includes a retractable peg 88 operated by a solenoid 89 to extend downwardly from the arm 80 to register with a recess 90 fashioned in the frames 70 as shown in FIGS. 7 and 8. Registry between the pegs 88 and the recesses 90 securely holds the frame 70 and wing 52 from pivoting about the wing pivot access. To retract the peg 88 into the arm 80 for pivoting of the wing, the solenoid 89 is energized from, for example, a main control panel (not shown) which may be tied in with a fire alarm system. Alternatively, the peg 88 and solenoid 89 may be replaced by an electromagnet or other suitable means for holding the frame 70 relative to the arm 80.

To permit a person to move from the general access area 26 to the security area 24, the shaft 50, in a manner described in detail below, is adapted t rotate 180° to move a selected compartment, for example compartment 54a, from a starting point such as the entrance 44, as shown in FIG. 2, to the exit 46. As can be appreciated, the rotation of the shaft 50 causes all the compartments to revolve similarly 180° within the housing 28.

To prevent unauthorized personnel from entering the security area 24 through the revolving door 20, a door control system is provided. The control system includes a microprocessor housed within a dustproof enclosure 94 on the top 42 which controls the starting, stopping, and direction rotation of the motor and shaft for revolving the compartments. As a specific example of the preferred embodiment, a "Sysmac-S6" manufactured by Omron Corporation of Kyoto, Japan and having a 0.5K memory has been used. Using the assigned relay numbers for the above specified controller, the following is a program useful to operate the door in the manner hereinafter described:

| | | | |
|---|---|---|---|
| LD 03 | AND N 94 | OUT 14 | AND 79 |
| OR 67 | OR 09 | LD 70 | OR TIM 4 |
| AND N 75 | OUT 12 | AND N 103 | OR TIM 3 |
| AND N 78 | LD 69 | OUT 102 | OR 96 |
| OUT 67 | LD 03 | LD 70 | OR 13 |
| LD 04 | OR 04 | OUT 103 | OR 59 |
| OR 68 | OR 109 | LD 70 | AND N 78 |
| AND N 75 | CNT O 002 | AND 102 | AND 66 |
| AND N 78 | LD CNT 0 | AND CNT 0 | AND N 94 |
| OUT 68 | AND N 09 | OUT 75 | AND N 09 |
| LD 67 | AND 99 | LD N 97 | OUT 13 |
| OR 68 | OR 14 | AND 05 | LD 70 |
| OR 60 | OR 13 | OR 76 | AND 13 |
| OR 64 | OR 60 | AND N 78 | OUT 78 |
| OR 52 | AND N 78 | OUT 76 | LD 69 |
| AND TIM 2 | AND N 75 | LD N 98 | OR 79 |
| OR 90 | LD N 03 | AND 07 | AND N 70 |
| AND N 91 | AND N 04 | OR 77 | OUT 79 |
| AND N 63 | OR 13 | AND N 78 | LD 05 |
| AND N 95 | AND LD | OUT 77 | OR 80 |
| AND N 100 | OR 64 | LD 76 | AND N TIM 1 |
| AND N 65 | AND N 100 | OR 77 | AND N CNT 0 |
| AND N 78 | OR 83 | AND N 70 | AND N 13 |
| OUT 80 | AND N TIM 6 | AND N 78 | AND N 07 |
| LD 07 | OUT 83 | OUT 74 | OUT 19 |
| OR 81 | LD 80 | LD 85 | LD 11 |
| AND N TIM 6 | AND 82 | TIM 6 005 | AND 90 |
| AND N CNT 0 | AND RDM 3 | LD 85 | OUT 91 |
| AND N 78 | OR 84 | OUT 16 | LD 69 |
| OUT 81 | AND N TIM 1 | LD N 10 | AND N 73 |
| LD 76 | OUT 84 | TIM 2 010 | AND N 74 |

-continued

| | | | |
|---|---|---|---|
| OR 77 | LD 84 | LD 03 | AND N 80 |
| OUT 21 | OR 73 | OR 18 | AND N 81 |
| LD 06 | AND N 70 | AND N 69 | AND N 91 |
| AND N 87 | AND N 78 | AND N 13 | OUT 96 |
| OUT 86 | OUT 73 | AND N 05 | LD 00 |
| LD 06 | LD 84 | OUT 18 | AND 12 |
| OUT 87 | TIM 1 005 | LD 67 | AND N 93 |
| LD 86 | LD 84 | OR 68 | OUT 92 |
| OR 82 | OUT 15 | AND 10 | LD 00 |
| AND N TIM 1 | LD 81 | TIM 3 020 | AND 12 |
| OUT 82 | AND 83 | LD TIM 3 | OUT 93 |
| LD 08 | AND RDM 3 | OR 90 | LD 12 |
| AND N 89 | OR 85 | AND N 78 | AND N 92 |
| OUT 88 | AND N TIM 6 | OUT 90 | TIM 4 020 |
| LD 08 | OUT 85 | LD 04 | LD 13 |
| OUT 89 | LD 85 | OR 19 | AND 12 |
| LD 88 | OR 74 | AND N 69 | AND TIM 4 |
| OR 95 | LD 04 | OUT 59 | OR 60 |
| AND N TIM 5 | OR 109 | LD N 66 | AND N 78 |
| OUT 95 | CNT 2 001 | OUT 64 | AND N 52 |
| LD 95 | LD 66 | LD 01 | OUT 60 |
| TIM 5 020 | LD 13 | OR 66 | LD 13 |
| LD 03 | LD 00 | AND N 109 | AND 11 |
| OR 97 | LD 61 | AND N 57 | OUT 65 |
| LD N TIM 1 | OR RDM 06 | OUT 66 | LD 60 |
| OR N CNT 1 | RDM | LD 66 | AND TIM 4 |
| AND LD | LD RDM 02 | AND N 101 | OR 94 |
| AND N 78 | OUT 71 | OUT 100 | AND N TIM 7 |
| OUT 97 | LD RDM 04 | LD 66 | OUT 94 |
| LD 04 | OUT 69 | OUT 101 | LD 94 |
| OR 98 | LD RDM 06 | LD 01 | TIM 7 020 |
| LD N TIM 6 | OR 61 | AND N 62 | LD TIM 4 |
| OR N CNT 2 | OUT 70 | OUT 61 | OR 63 |
| AND LD | LD RDM 05 | LD 01 | AND N CNT 7 |
| AND N 78 | OUT 99 | OUT 62 | OUT 63 |
| OUT 98 | LD N RDM 07 | LD 05 | LD 106 |
| LD 69 | OUT 20 | OR 06 | AND 63 |
| LD 03 | LD 60 | OR 07 | LD CNT 7 |
| OR 109 | AND RDM 4 | OR 08 | CNT 7 020 |
| CNT 1 001 | OR 59 | OR 02 | LD 12 |
| LD 69 | AND N 78 | AND N 12 | OR 11 |
| OR 10 | OUT 53 | | |
| AND 106 | LD 95 | | |
| LD 109 | OR 52 | | |
| OR 15 | AND N 17 | | |
| OR 16 | OUT 52 | | |
| OR 09 | LD N 12 | | |
| AND N 93 | AND 106 | | |
| LD 92 | LD 12 | | |
| AND N 53 | CTN 5 020 | | |
| OR LD | LD N CNT 5 | | |
| OR 17 | OUT 23 | | |
| CNT 3 150 | END BANK 0 | | |
| LD CNT 3 | | | |
| OUT 22 | | | |
| LD N RDM 10 | | | |
| OUT 17 | | | |
| LD N 09 | | | |
| AND N 58 | | | |
| OUT 57 | | | |
| LD N 09 | | | |
| OUT 58 | | | |
| LD TIM 04 | | | |
| OR 53 | | | |
| AND N 17 | | | |

| SET R D M |
|---|
| RDM 00 000 000 |
| RDM 01 005 005 |
| RDM 02 010 010 |
| RDM 03 015 015 |
| RDM 04 022 022 |
| RDM 05 025 025 |
| RDM 06 030 030 |
| RDM 07 003 021 |
| RDM 08 001 029 |
| RDM 09 001 003 |
| RDM 10 004 026 |
| RDM 11 010 026 |

Copyright 1984 REVOLVING DOOR CONTROL, INC.

Broadly speaking, the control system is adapted to operate the door 20 to prevent unauthorized personnel from both entering and leaving the security area. While the following description, for purposes of explanation, is primarily directed toward unauthorized entry into the security area 24, it is to be understood that the description is to be equally applicable to the situation wherein unauthorized personnel attempt to leave the security area 24.

The control system includes means for generating pulses in response to movement of the door during operation from which the position of the compartments can be determined. These pulse generating means may be embodied as a first proximity sensor 96. The first proximity sensor 96 is disposed on the multiplier 58 and includes a follower 98 adapted to engage a four lobe cam 100 shown graphically in FIG. 9. Cam 100 is keyed to the multiplier output shaft and accordingly rotates at a speed 1/5 of the motor output speed. When the motor 56 is activated for forward or reverse revolution of the shaft 50 and thereby the compartments 54a–54d, the cam 100 rotates displacing the follower 98. The first proximity sensor 96 translates displacement of the follower 98 into pulses which, by virtue of the cam 100 and gear reducer 60, occur for every 3° of revolution of the shaft 50 and compartments 54a–54d. These pulses provide input into the control system as to the progression of the wings 52 and thereby the compartments 54a–54d as they travel between the entrance 44 and the exit 46.

To provide reference input to the control system from which the pulses are counted and the door operation is reset, the control system includes a second proximity sensor 102. The second proximity sensor is disposed on a support 104 projecting upward from gear reducer 60. Also projecting upward from the gear reducer 60 is a wheel 106 coupled to the stub shaft 68 to rotate therewith, the wheel 106 including four outwardly projecting orthogonically arranged spokes 107. Spokes 107 are disposed over and in the same planes as the wings 52. Like the first proximity sensor, the second proximity sensor 102 has follower 108 (FIG. 9) the displacement of which causes the second proximity sensor 102 to generate input pulses to the control system and, more particularly, to the microprocessor. The second proximity sensor 102 is adapted to indicate to the logic of the control system index or reference positions for the wings 52 in the housing 28 to, in a manner described in detail below, position the door 20 in a locked position and to reset the control system.

For example, when an authorized person approaches the door 20, it will initially be in a locked position as shown in FIGS. 1 and 2 wherein the wings 52 are arranged within the housing 28 to prevent passage therethrough and to align compartment 54a at the entrance 44 and compartment 54c at the exit 46. Due to the high gear reduction between the motor 56 and the shaft 50, the member cannot be rotated. When the person enters the door 20 and the control system revolves or permits revolution of the member 48 in a forward direction (counterclockwise as shown in the drawings), the angular position of which is monitored by the first proximity sensor 96 in 3° increments. When the member 48 has revolved through a complete cycle to reposition the wings 52 180° from the starting point wherein compartment 54a is disposed at and aligned with the exit 46 and compartment 54c is similarly located at the entrance 44, a spoke 107 engages the follower 108 to cause the second proximity sensor 102 to send a pulse to the control system to stop the door and reset the control system for another sequence. To fine adjust the starting and stopping positions of the wings 52 to maintain the compartments properly aligned with the entrance and the exit, the wheel 106 may be angularly adjusted by rotation relative to the stub shaft 68.

To identify an authorized person and initiate the control sequence to revolve the shaft 50 and move the compartments 54a–54d through the housing 28 between the entrance 44 and the exit 46, a first card reader 110 is provided at the general access area 26. The first card reader 110 recognizes a card key 112 held by an authorized person, the recognition of which produces an input to the control system to start the forward revolution control sequence. To initiate the control sequence for forward revolution from the security area 24, a second card reader 114 is provided. While the preferred embodiment uses card readers, it is to be understood that keys, voice or palm identification, or other modes of recognition could be used in place of the card readers.

Figure 9:
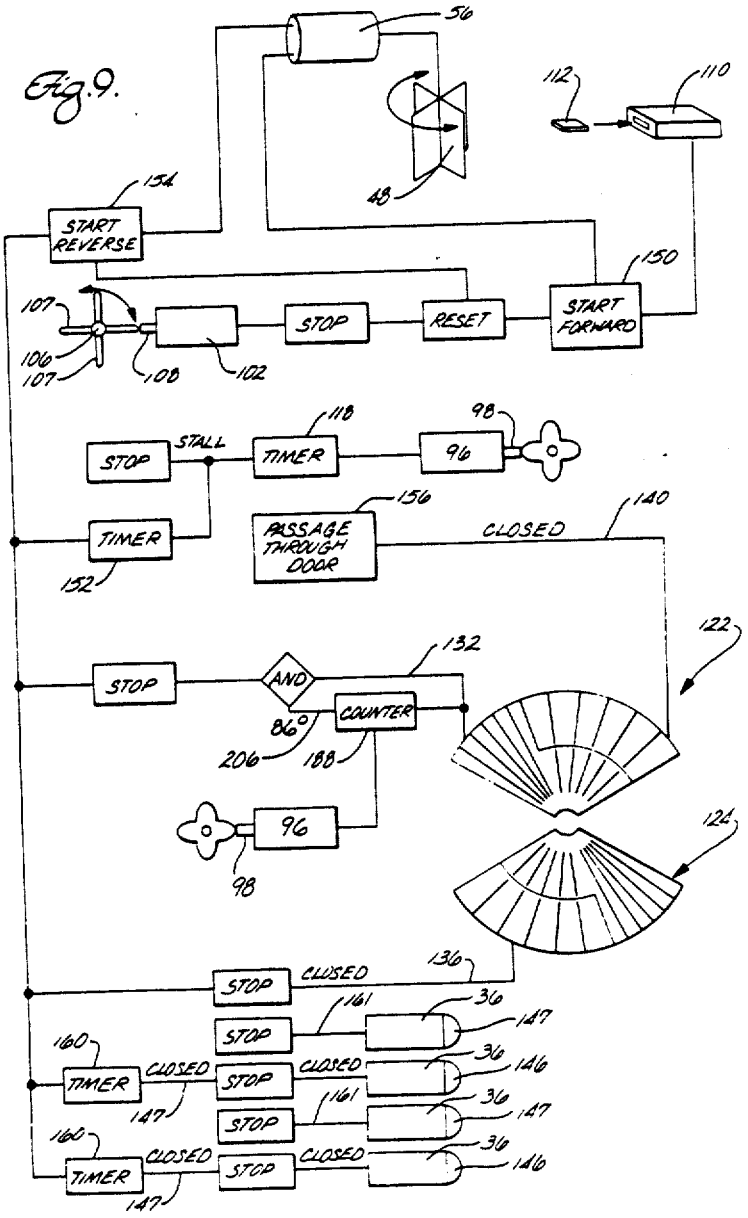
FIG. 9 is a schematic showing the operation of the control for the revolving door.

Referring to FIG. 9, an authorized person approaching the revolving door 20 from the general access area 26 inserts the card key 112 into the first card reader 110 which recognizes that person as authorized to enter the security area 24. The first card reader 110, upon recognition of an authorized person, sends an input signal to the processor. The processor's circuits initiate a start-forward control sequence 150. The start-forward control sequence begins with powering the motor 56 to accelerate the shaft 50 in a forward direction from the stationary locked position to the selected run speed. The initial acceleration and revolution of the shaft 50 and wings 52 moves the selected compartment 54a in a forward, counterclockwise direction from the entrance 44 toward the exit 46. The authorized person steps into the compartment 54a and walks with it to emerge from the revolving door 20 at the exit 46 and into the security area 24.

To prevent an authorized person from being trapped within the door 20 in the event of a door jam, the control system provides a unique safety feature. The door jam may originate from the person pushing against the wing trailing the compartment 54a or due to an object becoming trapped between a wing 52 and one of the panels 30. As can be appreciated, in the event of a jam, the revolution of the wings 52 and shaft 50 is stopped which, in turn, stops the stream of input pulses from the first proximity sensor 96 into the control system. In the event that the control system does not receive the pulses for a period of about two seconds as determined by a timer 118 (FIG. 9), the microprocessor stops the motor 56 and at the same time energizes a second timer 152. After a period of about five seconds as measured by the second timer 152, a signal is sent to the microprocessor to initiate a start-reverse revolution sequence 154. The start-reverse revolution sequence 154 initially accelerates the shaft 50 and wings 52 to the run speed, this time in a reverse, clockwise direction, to move the compartment 54a back toward the entrance 44. When the wings 52 have returned to the original quarterpoint starting position, a spoke 107 displaces the follower 108 causing the second proximity sensor 102 to send a signal to the processor which stops the motor 56 and revolving member 48 in the locked position.

As can be appreciated, the control system, by providing an anti-jam feature, protects personnel from injury by having a hand or foot trapped between a wing 52 and a panel 30 and from being trapped within the revolving door 20. Furthermore, the control system is adapted to return the compartments 54a–54d to the original starting quarterpoint positions so that, in the event of a jam, unauthorized or unintended access into the security area 24 is prevented.

In the absence of a jam of the door 20, or other control input as hereinafter set forth, the shaft 50 and wings 54 will continue to revolve at the run speed until they approach a point approximately 171° from their initial starting position as measured by counting the pulses from the first proximity sensor 96. At approximately 171° from the initial starting position, the processor initiates a slow-down sequence which decelerates the revolving wings 20 through the remaining 9° of rotation. When the wings 52 have fully revolved 180° as indicated by the pulses from the second proximity sensor 102, the processor stops the motor 56 to hole the door in a locked position. In this position the selected compartment 54a is aligned with the exit 46 permitting the person to leave the compartment 54a and enter the security area 24.

The sequence of an authorized person leaving the security area 24 to enter the general access area 26 and the anti-jam feature is the same as that described above. Referring to FIG. 1, to leave the security area 24, the authorized person would insert his or her card key 112 into the second card reader 114 which initiates the start forward sequence 150. As the wings 52 begin to revolve, the person steps into the compartment 54c and travels therewith, in the manner described above, to emerge at the entrance 44 at which position the door is again locked.

Figure 3A:
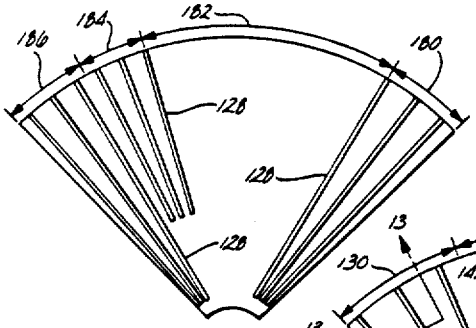
FIG. 3A is a bottom view of an preferred embodiment of sensing means shown as a mat incorporated into the revolving doors of FIGS. 1 and 2 which interfaces with a control to restrict access to authorized personnel.

To prevent piggy-backing and card pass back, the revolving door 20 includes one or a pair of semi-circular mats 122 and 124. Mat 122, as shown in FIG. 2, is disposed on the bottom 32 of the housing 28 between a panel 30 and shaft 50 in a forward direction from the entrance to the exit. Mat 124 is similarly disposed between a panel 30 and the shaft 50 in a forward direction from the exit to the entrance. Each mat 122 and 124 has a shape representing a segment of a circle and is adapted substantially to conform, as best shown in FIG. 2, to the shape of a compartment. The upper surface of each mat may be provided with a non-skid waterproof surface 125 or the like. The underside of each mat, concealed from view, is provided with a plurality of tape-type pressure switches as shown in FIGS. 3A and B. The pressure switches are adapted to be closed by foot pressure. It is to be understood that many other types of switches or the like may be used and substituted therefor for the tape-type pressure switches illustrated and described herein.

Figure 15:
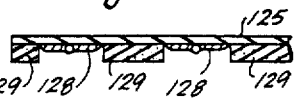
FIG. 15 is a partial section view of the mat taken along line 15—15 of FIG. 3B.

As shown in FIG. 15, the first pressure switches 128, as are all other pressure switches hereinafter described, are disposed along the bottom of the surface 125 and are spaced from one another by cushions 129 fashioned from foam rubber or the like. By adjusting the composition and amount of the cushions 129, the sensitivity of the switches can be altered. Furthermore, the cushions 129 serve as a means to segregate the switches from one another.

Figure 3B:
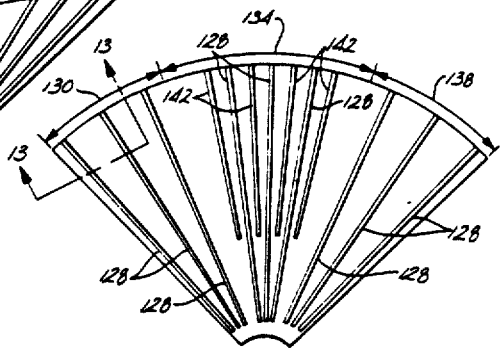
FIG. 3B is a bottom view of the mat similar to that of FIG. 3A illustrating another embodiment thereof.

Referring specifically to FIGS. 3B and 15, an embodiment of the mats is shown in detail. Each mat 122 and 124 includes a plurality, preferably 9, tape-type first pressure switches 128 arranged to project radially across each mat from the outer periphery to a point adjacent to the inner periphery which, when the mats are installed, are located near the shaft 50. In groups of three, the first pressure switches 128 are arranged and wired in parallel to define three equal sized, wedge-shaped sectors over each mat. Referring to FIG. 3B from right to left, three first pressure switches 128 are connected in parallel to define a first sector 130. The next three first pressure switches 128 are wired in parallel to define a second sector 134. The remaining three first pressure switches are wired in a parallel to define a third sector 138. Tape-type second pressure switches 142 are disposed in the second sector 134 to project inwardly from the periphery of each mat to a position representing approximately two-thirds ($\frac{2}{3}$) the radial width of the mat. The second pressure switches 142 are also connected in parallel, the purposes of which will hereinafter become evident.

As the authorized individual travels through the door 20, first pressure switches 128 for the first, second and third sectors 130, 134 and 138 are closed in sequence in response to the foot pressure of the authorized individual moving with the selected compartment through the door 20. When an unauthorized person attempts to piggy-back with an authorized person through the door 20, the first pressure switches 128 of the second sector 134 and first sector 130 are simultaneously closed sensing the presence of two persons within the compartment. When the microprocessor receives such signals from the pressure switches of the first and second sectors, the microprocessor generates a control signal to stop the motor 56 and at the expiration of time as determined by timer, reversely rotate the door back to its original starting position to discharge the individuals from the compartment.

To prevent an unauthorized person from passing in a reverse manner through the door 2, should the second pressure switches 142 of mat 124 be closed as the authorized person moves from the entrance 44 to the exit 46, the second pressure switches 142 generate a signal received by the microprocessor which, in turn, issues a command to the motor to stop and thereafter reversely rotate to discharge both individuals from the door 20.

When the door has revolved approximately 160° from the starting position, the authorized person is able to step from the third section 138 and from the door 20 into the security area 24. In this position, the wing 52 trailing the compartment 52a is disposed closely to the panel 38 preventing the authorized person from passing back his/her card key. Accordingly, when the wings 52 are revolved approximately 160° and the switches of the third sector 138 close, the control logic signals a passage through the door sequence which interfaces with a digital computer or the like that that particular authorized person has passed through the revolving door into the security area. The control logic may thereafter prevent the use of that particular card key or other identifying indicia from being reused to gain entrance into the security area 24 until the authorized person has left the security area, as determined by closure of the first pressure switches 142 of the third sector 138 for mat 124.

Turning to FIG. 3A, another embodiment of the mats for control of the door is shown in detail. Each mat is semicircular and includes along its underside a number, preferably 9, first pressure switches 128 arranged to define four wedge-shaped sectors on the mat.

The first sector 180 is adapted to be disposed nearest the entrance when the mat is in position, the first sector including three first pressure switches 128 connected in parallel and adapted to generate a signal to be received by the processor. Adjacent the first sector 180 is a buffer sector 182 which does not include any first pressure switches 128. Moving counter-clockwise in FIG. 3A, next to the buffer sector 182 is a second sector 184 which includes three, somewhat shorter, first pressure switches 128 connected in parallel and generating a signal to be received by the processor. Disposed nearest the exit 46 is a third sector 186 including three first pressure switches 128 connected in parallel and generating another signal to be received by the microprocessor.

The sensing means as embodied in the mats illustrated by FIG. 3A, are adapted to sense the progression of the authorized person within the selected compartment through the door 20. When the authorized person has enabled the microprocessor by insertion of a card key or the like, the microprocessor energizes a motor to begin to rotate the door and move the selected compartment 54a between the entrance and exit. As the door initially moves, the authorized person steps on and closes the first pressure switches 128 for the first sector 180. Continued movement of the compartment causes the authorized person to step from the first sector into the buffer sector 182 causing the first pressure switches in the first sector 180 to open. Continued movement of the compartment enables the authorized person to sequentially close the first pressure switches and the second and third sectors 184 and 186 which generate appropriate signals to the microprocessor.

Should the first pressure switches of the first sector 180 and second sector 184 be simultaneously closed, the two signals generated thereby and received by the microprocessor will result in a microprocessor issuing a control signal to deenergize the motor and reversibly rotate the door therefore preventing piggy-backing through the door. Further, should an unauthorized person seek passage through the door 20 in a reverse direction, the switches for mat 124 will generate signal received by the processor which, in turn, issues the disabling command to the motor and reversibly rotates the door. When the wings have revolved approximately 160° from the starting quarter point the first pressure switches in the third sector 186 are closed sending signals to an interfacing computer or the like that the authorized person has passed through the door to thereby prevent pass back of the authorizing indicia.

Figure 3C:
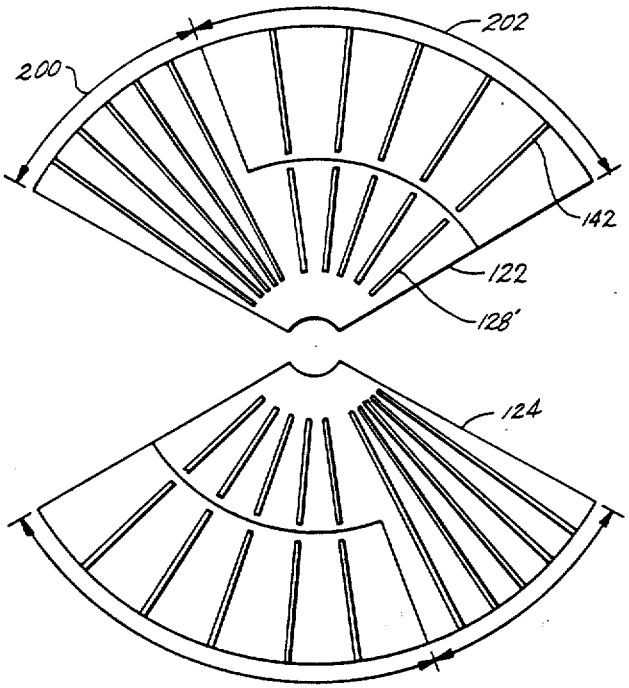
FIG. 3C is a bottom view of the preferred embodiment of the sensing means embodied as mats.

Turning to FIGS. 3C and 9, the preferred embodiment for the mats 122 and 124 and the operation of the door 10 will be described. In that the mats are substantially identical only mat 122 will be described in detail.

Mat 122 includes first pressure switches 128 each of which extends from adjacent the periphery in the mat radially to a location to lie adjacent to the shaft 50. As shown in FIG. 3C, these first pressure switches 128 are spaced from a position adjacent one edge of the mat 122 to a position approximately one-third the arc length for the mat. The first pressure switches 128 are connected in parallel with shorter, first pressure switches 128' which are spaced in a fanned fashion from the first pressure switches 128 to a position adjacent the trailing edge for the mat 122.

Accordingly, as can be appreciated in FIG. 3C, the parallel connected first pressure switches 128 and 128' define an L-shaped first sector 200 for the mat 122. Extending from the periphery of the mat 122 and for the remaining region of the mat 122 are second pressure switches 142 which are connected in parallel defining an annular segment shaped sector 202 for the mat 122 extending for approximately two-thirds the length for the mat. The sensing means as embodied by the first pressure switches 128, 128' and second pressure switches 142 are adapted to prevent anti piggy-backing and reverse pass for the door 20.

Figure 10A:
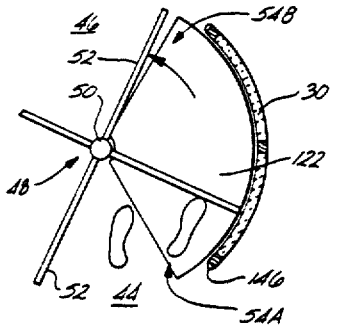
FIGS. 10A through 10D are a partial plan view of the door, illustrating the progression of an authorized person therethrough.
Figure 10B:
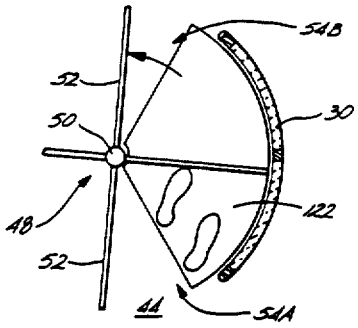
Figure 10C:
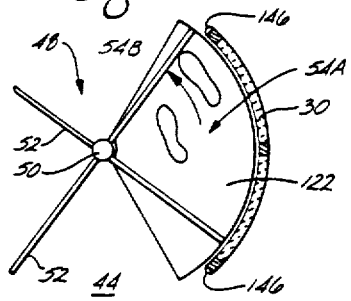
Figure 10D:
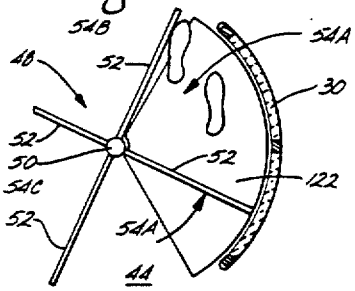

Referring to FIGS. 9 and 10A–10D, the progression of an authorized person through the revolving door 20 over the mat 122 is shown in detail. As the selected compartment 54a moves from the starting quarterpoint from the entrance 44 to the exit 46, the authorized person initially closes the first pressure switches 128 in the first sector generating a signal 132 received by the processor. Continued progression of the compartment 54a toward the exit 46, FIG. 10B, enables the person to take a second step on the mat 122, that second step also closing the first pressure switches in a first sector maintaining the signal 132. During the walking of an individual, foot pressure is transferred from one foot to the other closing the switches in the sector without interruption. Continued movement of the person with the compartment 54a to the position of FIG. 10C opens the switches of the first sector. The second switches 142 for second sector 202 are disabled for mat 122 during the progression of the authorized person from the entrance 44 to the exit 46. When the wings 52 have revolved approximately 160° from the starting position as approximately shown in FIG. 10D, the authorized person is able to step from the door 20 into the security area 24. In this position the wing 52 trailing the compartment 54a is disposed closely to the panel 30a preventing the authorized person from passing back his or her card key 112. Accordingly, when the wings 52 have revolved approximately 160° additionally sensing means may be provided which interface with a digital computer processor or the like (not shown) to indicate that particular person has passed through the revolving door 20 into the security area 24. The control logic of the door control and the interfacing computer thereafter prevent the use of that particular card key to again gain entrance into the security area 24. When the authorized person leaves the security area 24 through the door 20, the card key 112 may again be used to gain access into the security area. Of course it is to be understood that for this purpose each card key 112 must be individually encoded for each authorized person. The foregoing provisions effectively provide an anti-passback feature to prevent the card key from being used multiple times to gain access into the security area. Finally, as shown in FIG. 10D, the individual steps from the mat 122 and from the compartment 54a into the security area. The revolving member, in the manner described above slows down and stops after 180° of revolution.

The progression of an authorized person from the security area 24 to the generally access area 26 over mat 124 is identical to that described above.

Figure 11:
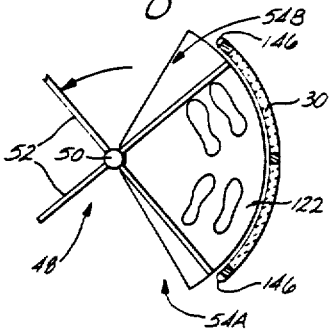
FIG. 11 is a partial plan view of the revolving door illustrating piggy-backing of an unauthorized person with an authorized person through the revolving door.

When an unauthorized person attempts to piggy-back with an authorized person through the revolving door 20, the situation encountered is graphically illustrated in FIG. 11. When the compartment reaches a designated position such as 86° from the starting quarterpoint, the microprocessor and more particularly pulse counting means therein generates a signal 206. In this position, the authorized person is standing close to the leading panel 52 to make room for the unauthorized person who necessarily is standing upon and closing the switches of the first sector 200. The simultaneous closing of the switches of the first sector at a position 86° from the starting quarter point signals the processor that two persons are in the compartment 54a and that a piggy-backing situation is present. The logic of the processor accordingly signals the motor 56 to stop and being the start-reverse rotation sequence 154 described above. The wings 52 revolve in the reverse direction to return the compartment 54a to the entrance 44 and stop and lock the revolving door 20.

It has also been determined that should the authorized person attempt to carry the unauthorized individual through on his/her back that at 86° from the starting quarterpoint the positioning of the authorized person's feet to maintain his/her center of gravity closes the first pressure switches 128 in the first sector 200 causing the microprocessor to stop the door and begin the reverse sequence.

Accordingly, it can be appreciated that unauthorized persons are unable to piggy-back with an authorized person from the entrance 44 to the exit 46. Furthermore, it is to be appreciated that the unauthorized person is rejected by the door 20 before he has a chance to enter the security area 24.

The situation wherein an unauthorized person is attempting to piggy-back with an authorized person from the security area 24 to the general access area 26 operates in the same fashion as described above, the sectors of mat 124 indicating the piggy-backing situation whereupon the processor instructs the motor to stop and reversely rotate to return the piggy-backing individuals to the exit 46.

Figure 12:
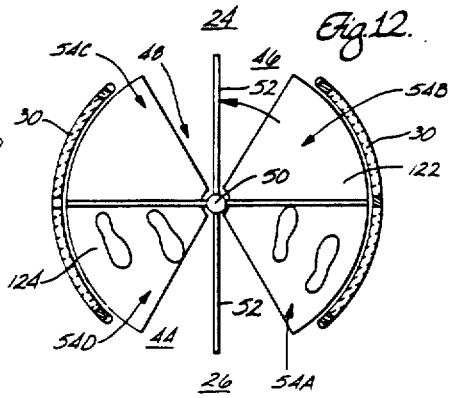
FIG. 12 is a plan view of the door schematically illustrating the simultaneous movement of an unauthorized person through the door with an authorized person.

To prevent the situation wherein an unauthorized individual is attempting to gain entrance simultaneously through the revolving door from the entrance 44 to the exit 46 as an authorized person moves from the exit 46 to the entrance 44, the second pressure switches are provided. Referring to FIGS. 9 and 12, the exemplary scenario is that an authorized person has started the control sequence to leave the security area 24 to enter the general access area 26. As the wings 52 revolve, an unauthorized individual entering compartment 54a attempts to move from the entrance 44 to the exit 46. In so doing, due to the foot pressure of the unauthorized individual, the second pressure switches 142 which are now energized are closed providing an input to the processor. The processor interprets the input as an unauthorized person attempting to pass through the door 20 and signals the motor 56 to stop and begin the start-reverse rotation sequence. The wings 52 are reversely rotated to return the compartments to their original starting position whereupon both the authorized and unauthorized person are free to leave the revolving door. The door 20 again stops in the locked position. Accordingly, the unauthorized person is effectively prevented from entering the security area 24. By the same token, an unauthorized person having somehow gained entrance into the security area 24 is prevented by the second pressure switches of mat 124 from leaving the area simultaneously with a person attempting to enter the security area 24.

To prevent foreign objects such as guns from being transported through the door, should the member 48 revolve 60° from the starting quarterpoint and the processor not receive an input from output 132, processor controls the door to stop and reversely rotate. As can be appreciated, the sensitivity of the mats must be adjusted to prevent objects such as guns or the like from closing the first pressure switches.

Referring to FIGS. 10A–10D, the progression of the authorized person through the revolving door 20 over the mat of FIG. 3A will be described. As the selected compartment 54a moves from the starting quarterpoint, the authorized person initially closes the first pressure switches of the first sector 180 energizing an output 132 into the processor. Continued progression of the compartment 54a toward the exit 46 enables the person to take a second step on the mat, this time in the buffer sector 182. Accordingly, the first pressure switches in the first sector 180 open de-energizing the output. Further progression of the compartment 54a toward the exit 46 enables the authorized person to sequentially close the first pressure switches in the second and third sectors 184 and 186 energizing specific outputs into the processor. Like the embodiment described above, when the wings 52 have revolved approximately 160° from the starting quarterpoint the processor signals an interfacing computer that the authorized person has passed through.

To prevent foreign objects from being passed through the door, should the wings 52 revolve 60° without the first pressure switches of the first sector 180 being closed by foot pressure, the processor will control the door to reversely revolve to the starting quarterpoint, As stated above, when the member 48 is jammed, a reverse revolution sequence is initiated. To prevent an unauthorized person from jamming the member 48 at a starting quarterpoint and moving in a reverse travling compartment between the entrance and exit, an additional feature is provided. If the member 48 is jammed at a quarterpoint, i.e., where a spoke 107 of the wheel 106 registers with the second proximity sensor 102 and the switches of the first sector 180 have been closed, the member 48 will stop and not reversely revolve. This feature is also provided in the various other embodiments for the door. Should an unauthorized person also enter the compartment, and a piggy-backing situation arise, his foot pressure will again close the switches of the first sector 180. Consecutive closure of the switches of the first sector 180 causes the processor to stop the member 48 and start the reverse rotation sequence. In the event that the unauthorized person closes the switches of the first sector 180 before the authorized person has stepped to the buffer sector 182, the control has an alternate method to sense piggy-backing. As the door revolves, the authorized person steps into the buffer sector 180 and then to the second sector 184 energizing a corresponding output therefor. At the same time, the unauthorized person has closed the switches of the first sector 180. Should the switches of the first and second sectors 80 and 184 be closed at the same time, the processor controls the motor 56 to stop and start the reverse sequence to reversely revolve the member 48 and return the compartment 54a to the starting quarterpoint. This, in turn, prevents the unauthorized person from piggy-backing between the entrance and exit.

To prevent an unauthorized person from moving simultaneously through the door with an authorized person, as shown in FIG. 12, yet another feature is provided. The control system, based upon insertion of the card key 112 into the card reader 100 determines over which of the mats 122 or 124 the authorized person will proceed. For purposes of discussion, it shall be assumed that the authorized person has activated the control to move from the entrance 44 to the exit 46 over the mat 122. Should an unauthorized person attempt to travel from the exit 46 to the entrance 44 over mat 124, their foot pressure will close the switches of the second sector 184. Closure of those switches will energize an output signaling the processor to stop the member 48 and initiate the start reverse sequence 154 to return the compartments to their initial starting quarterpoint. As can be appreciated, the reverse revolution of the member 48 prevents the unauthorized person from traveling through the door.

Figure 14:
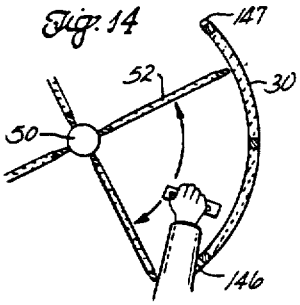
FIG. 14 is a partial plan view of the revolving door illustrating a safety feature to prevent the trapping of an arm or the like by the revolving door.

To provide an additional safety feature for the revolving door 20, edge switches 146 are provided along each of the edge posts 36 of the panels 30 forwardmost with respect to forward revolution of the member 48. The edge switches 147 are disposed at the remaining edge posts 36. Preferably the edge switches are tape-type pressure switches which close when depressed. Referring to FIG. 14, in the vent that a person intentionally or inadvertently places an arm or another appendage into a traveling compartment of the revolving door 20, that arm or appendage becoming trapped between a wing 52 and one of the panels 30 depresses and closes an edge switch 146. Closure of an edge switch 146 for a period of about 2 seconds as measured by a timer (not shown) provids an input 147 into the microprocessor as shown in FIG. 9. The processor interprets that input, stops the motor 56 and energizes a timer 160 which measures an elapsed time of about 2 seconds. After the expiration of 2 seconds, the timer 160 signals the start-reverse rotation sequence 154 which returns the wings 52 to their original starting position. Accordingly, persons are prevented from becoming trapped or injured by the revolving door 20. The edge switches 147 when depressed and closed contrary to the edge switches 146, provide an input 161 (FIG. 9) into the processor which stops the motor 56. The member 48 is not automatically reversely revolved and accordingly means must be provided to override the processor to restart the motor in either a forward or a reverse direction.

Figure 13:
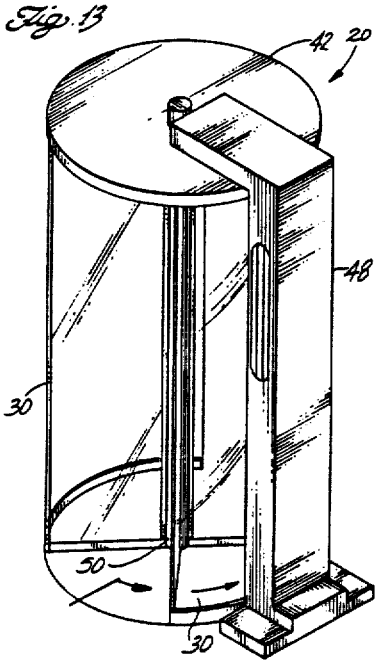
FIG. 13 is an embodiment of the revolving door incorporating a metal detector.

In yet another embodiment of the present invention, as shown in FIG. 13, a metal detector 148 may be provided at one or both of the panels 30. At a selected position along the travel of the compartments 54a–54d between the entrance 44 and the exit 46, the processor may be programmed to stop the revolution of the shaft 50 and wings 52 and conduct a scan via the metal detector 148 for weapons or the like. The position of stoppage of the panels 52 is determined based on the input from the first proximity sensor 96. Based on the determination of the metal detector 148, the forward sequence may be reinitiated by the processor to permit the individual to travel between the entrance 44 and the exit 46. If metal is detected, the processor initiates the reverse sequence to return the individual to the starting position.

Turning to FIGS. 16 and 17A–D, an alternative embodiment of the present invention is shown. In this embodiment, the door 20 is adapted to control access to an area which may house an automatic teller device 240 or the like. These devices have been subject to vandalism and other misdeeds and accordingly limiting access thereto by only those persons authorized such as card holding customers is desired.

In this embodiment, the door 20 includes a housing having a top and bottom which may be somewhat similar to those described with reference to the preceding embodiment.

The door 10 includes a rotatable member 48 having a shaft 50 coupled to the motor and supporting a pair of wings 52a and 52b spaced apart approximately 90°. The wings 52a and 52b cooperate with side walls 250a and 250b to define a cylindrical section shaped compartment 54 which houses the device 240. A microprocessor controls the operation of the motor in cooperation with sensing means which generates signals to indicate authorized or unauthorized persons. These sensing means are preferably embodied as a mat 122 similar to that described above and with reference to FIG. 3C.

Figure 16:
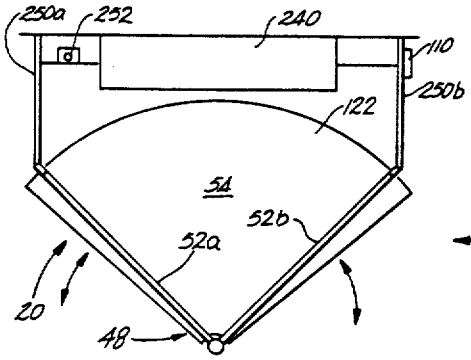

To operate the door, the authorized person inserts an authorizing indicia, such as a card key in a reader 110 provided on one of the walls 250b. When the control recognizes the authority of the person the processor energizes the motor which pivots approximately 45° as determined by, for example, second proximity sensor being engaged by a cam including appropriately arranged spokes to a position represented in FIG. 17A. In this position, the door stops for a designated period of time such as, for example, three seconds defining an entrance for the door. At the expiration of such time, the processor controls the motor to rotate the member 48 in a counterclockwise direction as shown in the drawings from the position shown in FIG. 17A to the position shown in FIG. 17B. In this position, which may be approximately 36° or the like from the starting position, as determined by an appropriate counter for the pulses generated by the first proximity sensor, should the first pressure switches 128 for the first sector be closed, the control will recognize it as a piggy-backing situation and stop the door and thereafter initiate a reverse rotate sequence to urge both individuals from the compartment. If a piggy-backing situation is not present, the member will continue to rotate and ultimately stop at its initial starting position as shown in FIG. 16.

In this position, a closed compartment is provided for the individual to conduct his/her transaction.

At the conclusion of the transaction, the individual depresses a control button 252 or the like which signals the processor that the transaction has been completed. The processor thereafter energizes the motor to rotate the member 48 in a counterclockwise direction as shown in FIG. 17C to ultimately stop at a position as shown in FIG. 17D defining an exit to permit the individual to egress from the compartment 54. After a period of time, for example, three seconds, the processor controls the motor to reversibly rotate (in a clockwise direction) to return the member 48 to its initial starting position as shown in FIG. 16.

Figure 17A:
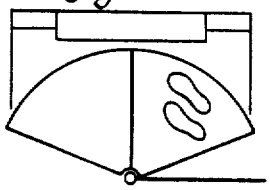
FIGS. 17A–17D illustrate the operation of the door of FIG. 16.
Figure 17B:
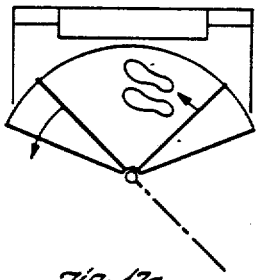
Figure 17C:
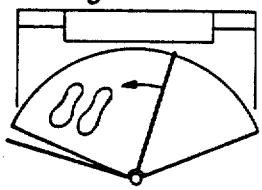
Figure 17D:
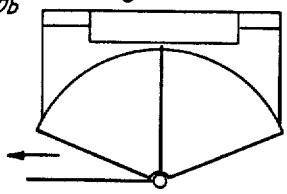

It should be noted that should an unauthorized person be sensend by closure of the first or second pressure switches 128 or 142 while the member 48 is at, respectively, the positions shown in FIGS. 17D and 17A, the processor will control the door to sweep the unauthorized individual away from the device 240.

While I have shown and described certain embodiments of the present invention, it is to be understood that it is subject to modification without departing from the spirit and scope of the attached claims. For example, rather than powering the revolving door 20 for revolution, the door may be manually revolved and provided with a brake and ratchet mechanism activated by the microprocessor to stop the shaft 50 and wings 52 and permit only reverse rotation thereof. Additionally, by virtue of the first and second proximity sensors, the progression of the compartment through the housing may be stopped one or several locations as desired to conduct various scans of the person to detect, for example, explosives or radioactive material.

What is claimed is:

1. A control for a security door of the type having a housing with an entrance and an exit, a member rotatably disposed in the housing and having a plurality of wings which, in cooperation with the housing, define at least one compartment movable between the entrance and exit in response to rotation of the member, the control comprising:

means for enabling the member for rotation to move a selected compartment from the entrance to the exit in response to identification of an authorized person;

means for generating pulses as the selected compartment moves between the entrance and exit, each pulse representing an increment of movement for the selected compartment;

means for determining the position of the selected compartment from the pulses;

means for sensing persons or objects in said selected compartment at at least one region between the entrance and exit, the sensing means generating a signal indicative of such persons or objects; and means for comparing the position of the selected compartment with the signal to indicate the passage of an authorized individual through the region, the comparing means issuing a command to prevent further rotation of the member and motion of the selected compartment when the position of the selected compartment and the signal indicates the presence of a second, unauthorized person or object in said region.

2. The control of claim 1 wherein the sensing means includes at least one switch closed by foot pressure as the individual enters the region.

3. The control of claim 1 wherein the sensing means is adapted to generate a second signal indicative of the presence of an unauthorized person within the housing and outside the selected compartment, the second signal preventing further rotation of the member to prevent unauthorized passage through the door.

4. The control of claim 3 wherein the sensing means includes a switch closed by foot pressure.

5. The control of claim 1 wherein the pulse generating means generates a pulse for approximately every 3 degrees of compartment revolution through the housing.

6. The control of claim 1 wherein the housing is cylindrical having the entrance diametrically opposed to the exit, the member being rotatable about a shaft disposed along an axis for the housing and having four equally spaced wings projecting from the shaft toward the housing, said comparing means issuing a control signal to stop the rotation of said shaft should the comparing means issue said command when the door has rotated approximately 86 degrees.

7. The control of claim 3 further including means to release the member for reverse rotation to return the unauthorized person to the initial point of entry into the door.

8. The control of claim 1 further including means for reversely rotating said member to return the selected compartment and the unauthorized person or object to the entrance.

9. The control for a security door of the type having a cylindrical housing with an entrance and diametrically opposed exit, a member rotatably disposed in the housing and having a plurality of wings which, in cooperation with the housing, define a plurality of compartments movable between the entrance and exit in response to rotation of the member, the control comprising:

means for enabling the member from an index starting position for rotation to move a selected compartment between the entrance and exit in response to identification of an authorized person;

means for generating pulses as the selected compartment moves between the entrance and exit, each pulse representing an increment of movement for the selected compartment;

means for counting the pulses from the index starting position to determine the position of the selected compartment;

means for sensing the authorized person within the selected compartment, the sensing means generating a signal as the person travels through a designated region in the housing; and means for comparing the position of the selected compartment with the signal to indicate the presence of a second person within the selected compartment and for issuing a command to prevent further rotation of the member.

10. The control of claim 9 wherein the comparing means issues the command when the signal is generated and the member has rotated approximately 86° from the starting index position.

11. A security door for controlling access to a device comprising:

a semicylindrical housing having a semicylindrical wall, a member rotatably supported in the housing, and a pair of wings disposed on the member and defining a compartment therebetween, the wings at a closed position cooperating with the wall to define an enclosure for the device;

means for enabling the member for rotation in a first direction to move the compartment from the closed to an open position in response to identification of an authorized person;

means for rotating the member in a reverse direction to move the compartment from the open toward the closed position;

means for generating pulses as the compartment moves from the open to the closed position, each pulse representing an increment of movement for the compartment;

means for counting pulses from the open position to determine the position of the compartment;

means for sensing the individual within the compartment, the sensing means generating a signal as the individual travels through a designated region in the housing; and means for comparing the position of the compartment with the signal to indicate the presence of a second unauthorized individual in the compartment and for issuing a command to prevent further rotation of the member and unauthorized access to the device.

12. A control for a revolving door for providing access into a room by only authorized personnel, the revolving door having a housing with an entrance spaced from an exit leading to the room, the revolving door including a rotatable shaft mounting a plurality of wings which define a plurality of compartments movable through the housing between the entrance and the exit in response to shaft rotation, the control comprising:

means for providing for rotation of the shaft in a forward direction, in a reverse direction and for preventing rotation of the shaft;

means for identifying an authorized person and controlling the rotation means to release and rotate the shaft in the forward direction to move a compartment from a starting position between the entrance to the exit, the authorized person traveling within the compartment to enter and leave the room; and means for sensing two persons traveling in the compartment, the sensing means controlling the shaft rotation means to rotate the shaft in the reverse direction to return the compartment to the starting position.

13. The revolving door control of claim 12 wherein the identifying means is a lock operated by a key.

14. The revolving door of control of claim 12 wherein the identifying means is a card reader operated by a card key.

15. The revolving door control of claim 12 wherein the sensing means includes a plurality of spaced switches closed in a preselected sequence by foot pressure as a person travels within the compartment between the entrance and the exit, a second person entering the compartment closing switches out of sequence to control the shaft rotation means to reversely rotate the shaft and return the compartment to the starting position.

16. The revolving door of claim 15 wherein the switches are arranged in sectors between the entrance and the exit, each sector of switches closed in progression as a person moves within the compartment between the entrance to the exit, a second person entering the compartment closing a sector of switches out of progression to control the shaft rotation means to reversely rotate and return the compartment to the starting position.

17. The revolving door control of claim 15 wherein said switches are tape switches disposed on the underside of the concealing mat.

18. The revolving door control of claim 15 wherein the switches are arranged in first through third wedge-shaped sectors extending between the shaft and the housing, the first sector disposed nearest the starting position and the third sector disposed remote from the starting position, the switches of said first through third sectors closed and opened in progression by foot pressure as a person travels within the selected compartment between the entrance and the exit, closure of the switches of the first and second sectors indicating a second person in the compartment and controlling the shaft rotation means to reversely rotate and return the compartment to the starting position.

19. The revolving door control of claim 15 wherein the switches are arranged in first through third wedge-shaped sectors, the first sector disposed nearest the starting position, the third sector disposed remote from the starting position, the second sector arranged adjacent the third sector spaced from the first sector, the switches of the first sector closed and opened as a person travels within the selected compartment, repeated closure of the switches of the first sector indicating a second person in the compartment and controlling the shaft rotation means to reversely rotate and return the compartment to the starting position.

20. The revolving door control of the claim 19 wherein the switches of the third sector are closed when the selected compartment approaches the exit, closure of said third sector switches signaling the identifying means that the authorized person has passed through the revolving door to prevent an unauthorized person from using the same identifying indicia to pass through the revolving door.

21. The revolving door control of claim 20 wherein the identifying indicia is a card key, closure of said third sector switches by the authorized person signaling the identifying means to prevent an unauthorized person from using the same card key.

22. The revolving door control of claim 12 further including a second means for sensing an unauthorized person traveling in a second compartment moving between the entrance and the exit from an opposite starting point as the first compartment moves from the starting point, the second sensing means controlling the shaft rotating means to reversely rotate and return the second compartment to the opposite starting point.

23. The revolving door control of claim 22 wherein the second sensing means is at least one switch closed by foot pressure.

24. The revolving door control of claim 22 including a plurality of tape switches disposed on the underside of a concealing mat.

25. The revolving door control of claim 12 wherein the shaft rotating means is a reversible motor coupled to the shaft, the motor when stopped preventing rotation of the shaft.

26. A method for preventing unauthorized entry into a security area including a revolving door having a housing with an entrance spaced from an exit which communicates with the security area and a plurality of wings revolvable within the housing, said wings in cooperation with the housing defining compartments movable in response to wing revolution to permit an authorized person to travel between the entrance and the exit, the method comprising the steps of:

restraining the wings against revolution to prevent movement of the compartments between the entrance and the exit;

releasing the wings for revolution from a starting point in response to identification of an authorized person; and sensing the presence of two or more persons in any one compartment and restraining the wings against further revolution.

27. The method of claim 26 wherein the wings are released for revolution to move a compartment and an authorized person from the exit to the entrance, the method further including sensing the movement of an unauthorized person in a compartment moving from the entrance toward the exit and restraining the wings against further revolution.

28. The method of claim 26 further including reversely revolving the wings to return the two persons in the compartment to the starting point.

29. A revolving door and control to limit access to a security area comprising:

a housing having an entrance spaced from an exit which communicates with the security area;

a member revolvably disposed in the housing, the member including a plurality of wings which, in cooperation with the housing, define compartments to revolve with the member to move an authorized person between the entrance and the exit through the housing:

reversible drive means to revolve the member and compartments in a forward direction and in a reverse direction;

means to restrain the member and compartments against revolution;

means for identifying an authorized person, said identifying means controlling the drive means to revolve the member and compartments in a forward direction to transport the authorized person in a selected compartment from a starting position between the entrance and the exit through the housing; and means for sensing two persons traveling in the selected compartment, the sensing means controlling said drive means to revolve the member and compartments in a reverse direction to return the selected compartment to the starting position.

30. The revolving door of claim 29 wherein the authorized person is traveling in the selected compartment, moving from either the exit or entrance, the revolving door further including second means to sense an unauthorized person traveling with a second compartment from a second starting point at the other of the exit and entrance, said second sensing means controlling said drive means to revolve the compartments in a reverse direction to return the second compartment to the second starting point.

31. The revolving door of claim 29 wherein said sensing means includes at least two switches disposed to be closed in sequence as the authorized person moves with the compartment, closure of both of the switches sensing two persons in said compartment.

32. The revolving door of claim 29 wherein said sensing means includes at least two switches disposed to be closed in progression as the authorized person moves with the compartment, consecutive closures of a switch sensing two persons in the selected compartment.

33. The revolving door of claim 29 wherein the sensing means includes a mat having along its underside at least two switches closed in sequence as a person moves with the selected compartment between the entrance and the exit, closure of the two switches together sensing two persons in the selected compartment.

34. The revolving door of claim 33, consecutive closures of one of said switches sensing two persons in the selected compartment.

35. The revolving door of claim 33 wherein said switches are tape-type switches closed by foot pressure and are arranged in sectors, the switches in each sector connected in parallel.

36. The revolving door of claim 29 wherein the identifying means includes key means, the revolving door further including second sensing means coupled with the key means to indicate that a particular authorized person has passed from the entrance to the exit and to prevent an unauthorized individual from using the same key means to also pass from the entrance to the exit.

37. The revolving door of claim 30 wherein the second sensing means is a switch closed as the selected compartment registers with the exit.

38. The revolving door of claim 30 wherein the second sensing means includes at least one tape-type pressure switch closed by foot pressure.

39. The revolving door of claim 34 wherein the sensing means includes at least two tape-type pressure switches disposed on the underside of a concealing mat, said switches of the sensing means arranged in a first sector nearest the starting position and a second sector adjacent the first sector.

40. The revolving door of claim 39 wherein the second sensing means includes at least one tape-type pressure switch closed by foot pressure disposed in a discrete third sector remote from the first sector.

41. The revolving door of claim 29 further including means for sensing stall of revolution of the member for a first period of time, the stall sensing means controlling the drive means to stop the member for a second period of time and at the expiration of the second period of time controlling the drive means to revolve the member in a reverse direction to return the selected compartment to the starting position.

42. The revolving door of claim 41 wherein the first period of time is at least 2 seconds and the second period of time is at least 5 seconds.

43. A revolving door and control to limit ingress and egress to and from a security area to authorized personnel comprising:

a housing having an entrance spaced from an exit which communicates with the security area;

a revolving member disposed in the housing, the member including a shaft and a plurality of outwardly projecting wings which, in cooperation with the housing define compartments to revolve with the shaft and transfer an authorized person between the entrance and the exit;

reversible drive means to revolve the member and compartments in a forward direction, reverse direction and to stop the member against revolution;

means for identifying an authorized person and controlling the drive means from a starting position to revolve the member and compartments in a forward direction to move a selected compartment and authorized person from the entrance to the exit and stop;

means for sensing two or more persons in the selected compartment moving from the entrance to the exit, said sensing means controlling the drive means to reversely revolve the member to return the selected compartment to the starting position and stop; and means for sensing travel by an unauthorized person in another compartment from the exit to the entrance with the movement of the authorized person from the entrance to the exit, the travel sensing means controlling the drive means to reversely revolve and return the unauthorized person to the exit.

44. The revolving door of claim 43 wherein the identifying means identifies the authorize person by individual indicia which are transferable, the revolving door further including means for sensing the passage of an authorized person from the entrance to the exit, the passage sensing means controlling the identifying means to reject use by an unauthorized person to attempt to pass through the revolving door.

45. The revolving door of claim 44 wherein the individual indicia is a key encoded for each authorized person.

*46. A control for a security door of the type having a housing with an entrance and an exit, a member rotatably disposed in the housing and having a plurality of wings which, in cooperation with the housing, define at least one compartment movable between the entrance and exit in response to rotation of the member, the control comprising:*

*means for enabling the member for rotation to move a selected compartment between the entrance and exit in response to identification of an authorized person;*

*means for generating pulses as the selected compartment moves between the entrance and exit, each pulse representing a small increment of movement of the selected compartment, and being independent of any specific positional relationship of the wings to the housing;*

*means for determining the position of the selected compartment from the pulses;*

*means for sensing an unauthorized person or object in at least one position between the entrance and exit, the sensing means generating a signal indicative of such person or object; and*

*means for comparing the position of the door with the signal to indicate the passage of the authorized individual through the designated region, the comparing means issuing a disabling command to prevent further motion of the compartment toward the exit when the position of the compartment and the signal indicates the presence of an unauthorized person or object.*

*47. A control for a security door of the type having a housing with an entrance and an exit, a member rotatably disposed in the housing and having a plurality of wings which, in cooperation with the housing, define at least one compartment movable between the entrance and exit in response to rotation of the member, the control comprising:*

*means for enabling the member for rotation to move a selected compartment between the entrance and exit in response to identification of an authorized person;*

*means for generating pulses as the selected compartment moves between the entrance and exit, each pulse representing a small increment of movement for the selected compartment, and being independent of any specific positional relationship of the wings to the housing;*

*means connected to the pulse-generating means for determining at least one specific positional relationship of the wings to the housing to enable determination of the compartment position from the pulses;*

*means for sensing an unauthorized person or object in at least one position between the entrance and exit, the sensing means generating a signal indicative of such person or object; and*

*means for comparing the position of the door with the signal to indicate the passage of the authorized individual through the designated region, the comparing means issuing a disabling command to prevent further motion of the compartment toward the exit when the position of the compartment and the signal indicates the presence of an unauthorized person or object.*

* * * * *